United States Patent Office

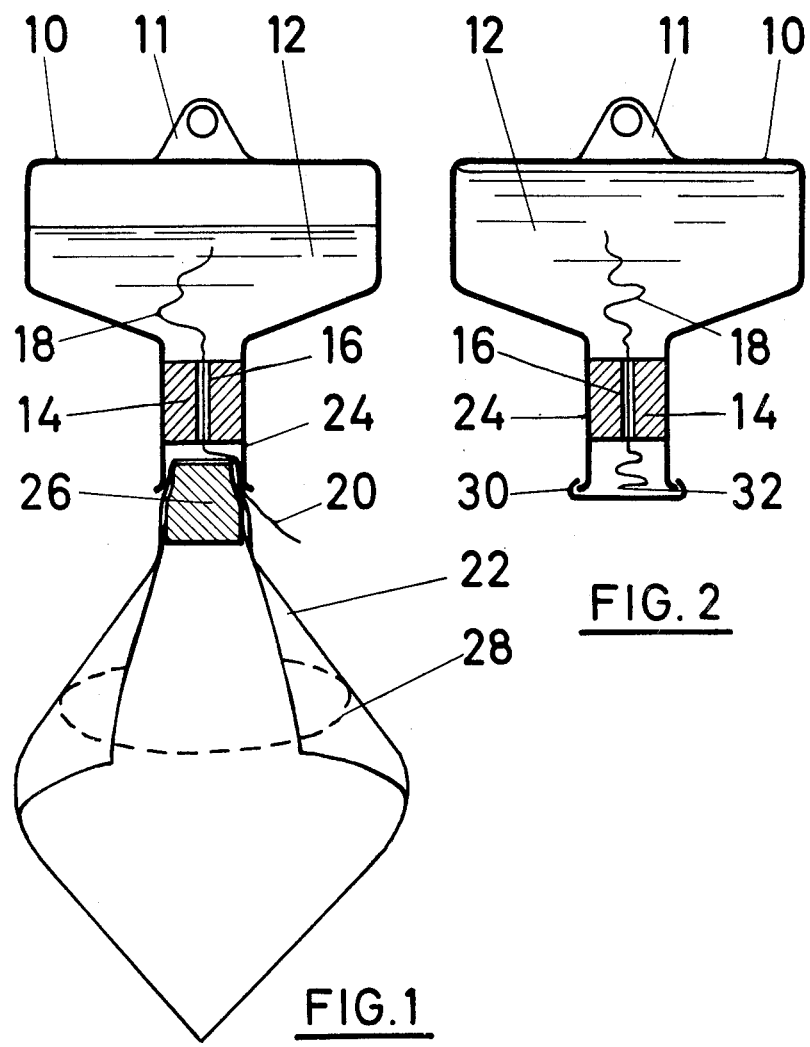

3,211,345
Patented Oct. 12, 1965

3,211,345
DEVICE FOR THE LONG-CONTINUED EMISSION OF ACTIVE SUBSTANCE
Max Geiger, Basel, Switzerland, assignor to Ciba Limited, Basel, Switzerland, a company of Switzerland
Filed June 25, 1962, Ser. No. 204,975
Claims priority, application Switzerland, June 29, 1961, 7,685/61
7 Claims. (Cl. 222—187)

The present invention provides a device for the long-continued emission of active substances.

In the use of active substances, such as biocides, for example, insecticides, etc., it is desirable in many cases that their emission into an ambient medium, for example, air or water, be effected in such manner that their concentration in the said medium remains as constant as possible. It is necessary in many cases, in view of the toxicity of the active substance used and the upper limit set to the concentration at which it can be applied that a given concentration be maintained as exactly as possible, in other words, that the rate of emission of active substance be as near constant as possible. Furthermore, the success attainable with a given amount of active substance is all the greater, the more constant the concentration used.

Emission of the active substance into the ambient air can be effected, for example, by spraying, for example, as an aerosol, or by evaporation. When spraying in the form of an aerosol, the concentration of active substance in a treated room diminishes rapidly because of air escaping through, for example, doors or windows, and because of deposition of the aerosol particles on the walls. In many cases, the active substance that settles on the walls is destroyed in a short time by chemical interaction with the building materials, which are generally alkaline. In order to maintain as constant a concentration as possible it is therefore necessary to repeat spraying periodically, and, as this operation has to be performed either manually or automatically, personnel or else a complicated and therefore expensive timer is required. In the case of continous evaporation of the active substance, for example, by means of a wick, the dependence of the evaporation on temperature has a disturbing effect so that it is only with great difficulty that the concentration of active substance in a room to be treated can be kept constant over a long period. Furthermore, in view of the toxicity of most active substances, accumulation of a dangerous concentration of unevaporated active substance at the place of application must be avoided.

The present invention provides a device which provides for the long-continued even evaporative emission of liquid active substances into a region, which comprises a storage reservoir for the liquid, and evaporation surface which, when the device is in use, is exposed to the region, and means for continuously withdrawing liquid from the storage reservoir and supplying it to the evaporation surface at a rate that is substantially independent of the rate of evaporation of the liquid from the surface.

The rate of evaporation from the evaporation surface depends inter alia upon the area of that surface "wetted" by the liquid and the conditions in the surrounding atmosphere. The extent of the evaporation surface and its arrangement with respect to the region of supply of liquid to it should, when the device is in use, be such that at no time during normal operating conditions is there a tendency for the liquid to spread beyond the boundary edges of the evaporation surface or to drip from it. In other words, the evaporation rate of liquid from the surface should not, for any appreciable length of time be less than the rate of supply of liquid to the evaporation surface. In practice, this is easy to arrange.

The evaporation surface is advantageously provided by a sheet of absorbant material, preferably, nylon fabric through which the liquid can spread from the point of supply to the material by capillary action.

Advantageously, the said means withdraws liquid from the storage reservoir and supplies it to the evaporation surface at least in part by capillary action. The said means may be a thread of twisted fiber, preferably a twisted nylon thread. Preferably the liquid is so supplied to the evaporation surface that it could spread out along the surface in all directions.

The invention is illustrated by the attached drawing.

FIG. 1. The device of the invention ready for use.

FIG. 2. The storage vessel of the same device when not in use.

The device shown in FIG. 1 is ready for use and consists of a storage vessel 10 which is filled with the active substance 12. The device can be hung up by means of a ring 11 so that the opening is downwards. This opening is closed by means of a stopper 14 having a bore hole 16 through which a flexible capillary 18 passes. A twisted nylon thread may be used as capillary. The end 20 of the capillary 18 that extends beyond the bore hole 16 of the stopper 14 is in contact with an evaporation surface 22. The evaporation surface 22 is wedged into the neck 24 of the storage vessel 10 by means of a stopper 26.

In accordance with the invention the diameter of the capillary, which determines the flow of liquid, is such that the amount of active substance that continuously leaves the storage vessel 10 through the capillary 18 is smaller than the amount that can evaporate on the evaporation surface 22 under unfavourable working conditions. It is known that the amount of liquid that evaporates from a surface is dependent on the temperature in particular and on the moisture content and pressure of the ambient atmosphere. Thus, at a low temperature or in the case of high saturation of the ambient air with active substance, less active substance evaporates per unit of surface than at a high temperature or in the case of lower saturation of the atmosphere. Since the amount of liquid supplied through the capillary is practically independent of temperature the wetted zone, which is the zone over which evaporation takes place on the evaporation surface, spreads as the temperature decreases. The decrease in evaporation per unit of surface caused by a drop in temperature is compensated by the increase in the area over which evaporation takes place. As the temperature rises the area over which evaporation takes place decreases, whereby the decrease in evaporation per unit of surface is again compensated. Since, in accordance with the invention, the amount passing through the capillary is such that it evaporates continuously under the most unfavorable conditions that can be expected, there is no build-up on the evaporation surface of active substance that cannot evaporate and that, by reflux, would reduce the diffusion and thus the flow in the capillary. As already mentioned, a build-up of active substance on the evaporation surface must be prevented at all costs when toxic active substances are used.

Naturally, the amount of active substance that passes through the capillary must be sufficient to ensure that the concentration essential to successful application is present in the room to be treated. When using twisted nylon thread the amount passed through the capillary can be adjusted as required by suitable choice of the diameter of the thread itself and the diameter and number of the single threads which from the twisted thread. The size of the evaporation area must be such that even under unfavorable conditions complete evaporation of this amount can take place. If the device is operating under more favorable conditions, for example, at a temperature above the stipulated lower temperature limit, only a portion of the evaportion surface is required for evaporation, for example, the upper part which is marked by a broken line 28 in FIG. 1.

Since the transportation of liquid by capillary action is only very slightly dependent on temperature, the amount of active substance supplied to the evaporation surface for evaporation is to large degree constant so that the desired emission of a constant volume of active substance is ensured, even over a long period of time and at large variations in temperature.

FIG. 2 shows the storage vessel 10 of FIG. 1 when not in use or when ready for transportation. When thus, the neck 24 is closed by a cap 30 which shuts off the end 32 of the capillary 18 that protrudes beyond the stopper 14 from the outside atmosphere. In this manner, efflux of active substance from the storage chamber is prevented when the device in not in use.

In order that the person using the device does not come into contact with the active substance in the capillary when removing the cap 30, the lower end of the capillary 18 can be attached to the cap 30 or, alternatively, a weight can be attached to the capillary at its lower end so that it hangs down when the cap is removed and can be brought into contact with the evaporation surface 22.

Naturally, the present invention is not restricted to the illustrated example attached hereto. For example, the absorbant material used for the evaporation surface can be, instead of a nylon fabric, some other absorbant fabric or absorbant paper, for example, filter paper. Likewise, instead of using a nylon thread as capillary, a strip of some other absorbant fabric or absorbant paper can be used.

The amount which is transported through the capillary is to a certain degree dependent on the level of the liquid in the storage vessel above the exit. The head diminishes during use. In order to prevent this causing a serious reduction in the amount of active substance emitted in the course of use it is advantageous to make use of a storage vessel which is broader than it is deep so that the reduction in head that occurs when it empties is as small as possible. Hence, the device illustrated in FIG. 1 has a diameter which is large in proportion to its height.

Furthermore, when the liquid leaves through the capillary, pressure is reduced in the storage vessel and this likewise leads to a reduction in the amount emitted during the course of use. To remedy this the storage chamber can be fitted with elastic walls, for example, in the form of a bag made of a thin plastic material, for example, polyethylene, so that its volume can always adjust itself to the amount of active substance present. If the storage vessel used has inelastic walls it can be furnished with an opening to permit the entry of air but which is sufficiently small to prevent the escape of fluid when the device is not in use. If necessary, the said opening can be arranged in such manner that it is not opened until the cap used for transportation is removed.

The new device is particularly suitable for the long continued emission of a constant volume of insecticidal organic phosphorus compounds, for example, dimethyl-dichlorovinyl-phosphate.

What I claim is:

1. A device which provides for the long-continued even evaporation of liquid active substances, the said device consisting of a storage vessel for the liquid active substance, an evaporation surface comprising an outwardly extending sheet material open to atmosphere and a thin capillary between the storage vessel and the evaporation surface, the effective diameter of the capillary being such that the amount of active substance that is continuously delivered to the evaporation surface is smaller than the amount evaporated in the same unit of time, the capillary passing through and being closely fitted in a stopper which closes the storage vessel and consists of material impermeable to the active substance.

2. A device as claimed in claim 1, the evaporation surface of which consists of absorbant material.

3. A device as claimed in claim 1, in which a sheet of absorbant paper is used as evaporation surface.

4. A device as claimed in claim 1, in which a piece of nylon fabric is used as evaporation surface.

5. A device as claimed in claim 1, in which a strip of absorbant paper is used as capillary.

6. A device as claimed in claim 1, in which a twisted nylon thread is used as capillary.

7. A device as claimed in claim 1, the storage vessel of which is closed by means of a pierced stopper and the capillary passes through the hole bored in the stopper.

References Cited by the Examiner

UNITED STATES PATENTS

| | | | |
|---|---|---|---|
| 897,131 | 8/08 | Owen | 222—187 |
| 1,129,897 | 3/15 | Owen | 239—45 |
| 1,377,909 | 5/21 | Moulin | 239—45 |
| 1,436,645 | 11/22 | Brown | 222—478 |
| 1,974,414 | 9/34 | Dupuy | 239—45 |
| 2,283,028 | 5/42 | Bailey | 239—45 |
| 2,975,464 | 3/61 | Schultz | 239—44 X |

SAMUEL F. COLEMAN, *Primary Examiner.*

LOUIS J. DEMBO, *Examiner.*